(12) United States Patent
Cuaresma, Jr. et al.

(10) Patent No.: US 12,076,678 B2
(45) Date of Patent: Sep. 3, 2024

(54) FILTER AND VACUUM FOOD PROCESSOR

(71) Applicant: KONINKLIJKE PHILIPS N.V., Eindhoven (NL)

(72) Inventors: Samuel Cuaresma, Jr., Hong Kong (HK); Chuangguan Xu, Shenzhen (CN); Kin Wai Tang, Hong Kong (HK)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1065 days.

(21) Appl. No.: 16/966,042

(22) PCT Filed: Feb. 4, 2019

(86) PCT No.: PCT/EP2019/052600
§ 371 (c)(1),
(2) Date: Jul. 30, 2020

(87) PCT Pub. No.: WO2019/149923
PCT Pub. Date: Aug. 8, 2019

(65) Prior Publication Data
US 2020/0353398 A1 Nov. 12, 2020

(30) Foreign Application Priority Data

Feb. 5, 2018 (CN) .......................... 201810112991.0
Feb. 5, 2018 (CN) .......................... 201820197576.5
Apr. 4, 2018 (EP) ..................................... 18165612

(51) Int. Cl.
*B01D 46/00* (2022.01)
*A47J 43/04* (2006.01)
*B01D 46/42* (2006.01)

(52) U.S. Cl.
CPC .......... *B01D 46/0005* (2013.01); *A47J 43/04* (2013.01); *B01D 46/4227* (2013.01); *B01D 2265/021* (2013.01); *B01D 2273/28* (2013.01)

(58) Field of Classification Search
CPC ............ B01D 46/0005; B01D 46/4227; B01D 2273/28; A47J 43/04
See application file for complete search history.

(56) References Cited

FOREIGN PATENT DOCUMENTS

| CN | 103892717 A | 7/2014 |
|---|---|---|
| CN | 106308575 | 1/2017 |

(Continued)

OTHER PUBLICATIONS

English Machine Translation of CN206213940 to Gang (Year: 2017).*

(Continued)

*Primary Examiner* — Anshu Bhatia
(74) *Attorney, Agent, or Firm* — Maschoff Brennan

(57) ABSTRACT

Embodiments of present disclosure relates to a filter for use in a vacuum food processor and a vacuum food processor including the filter. The filter comprising: a first filter part adapted to direct a suction airflow generated by a vacuum module of the vacuum food processor into the filter via an inlet channel; and a second filter part adapted to coaxially fit with the first filter part and comprising a cavity, the cavity adapted to maintain non-gaseous substance that is moving along with the suction airflow inside the filter, wherein the first filter part and the second filter part jointly define an outlet channel at a bottom of first filter part, the outlet channel adapted to direct the suction airflow outside the filter. In this way, the food particles/bubbles can be prevented from entering the vacuum module, while the suction airflow is allowed to freely flow to the vacuum module.

15 Claims, 4 Drawing Sheets

(56) References Cited

FOREIGN PATENT DOCUMENTS

| | | |
|---|---|---|
| CN | 106724947 | 5/2017 |
| CN | 206166749 | 5/2017 |
| CN | 206213938 | 6/2017 |
| CN | 206213940 | 6/2017 |
| CN | 206462899 | 9/2017 |
| CN | 206659710 | 11/2017 |
| CN | 107581916 A | 1/2018 |
| CN | 208693080 U | 4/2019 |
| WO | 2016072203 | 5/2016 |
| WO | 2017/161854 | 9/2017 |

OTHER PUBLICATIONS

International Search Report and Written Opinion Dated May 9, 2019 For International Application No. PCT/EP2019/052600 Filed Feb. 4, 2019.

* cited by examiner

FILTER AND VACUUM FOOD PROCESSOR

CROSS REFERENCE TO RELATED APPLICATIONS

This application is the U.S. National Phase application under 35 U.S.C. § 371 of International Application No. PCT/EP2019/052600 filed Feb. 4, 2019, published as WO 2019/149923 on Aug. 8, 2019, which claims the benefit of European Patent Application Number 18165612.5 filed Apr. 4, 2018, Chinese Patent Application Number 201820197576.5 filed Feb. 5, 2018 and Chinese Application Number 201810112991.0 filed Feb. 5, 2018. These applications are hereby incorporated by reference herein.

FIELD OF THE INVENTION

Embodiments of present disclosure generally relate to home appliance, and more specifically, to a filter and a vacuum food processor including the filter.

BACKGROUND OF THE INVENTION

Vacuum food processor for mixing or blending is becoming popular kitchen appliance. This type of food appliance is usually equipped with a vacuum module that consists of several components, such as motor pump, tubes, control electronics, pressure sensors. A common problem of this food appliance is the potential contamination of the vacuum module caused by the sucked-in liquid, steam, food particles moving along with the suction air flow. Such contamination will lead to the degradation and even the damage of the appliance.

A mechanism for avoiding food particles/bubbles from entering into the vacuum module is proposed in WO2016072203A1. However, this mechanism requires a complex construction. Moreover, when a great amount of food particles/bubbles is sucked and trapped, the suction airflow might be blocked as well. Another mechanism for blocking debris is proposed in CN106724947A, which also requires a complex construction.

SUMMARY OF THE INVENTION

In order to prevent the food particles/bubbles from entering the vacuum module in a simple and reliable way, embodiments of the present disclosure provide a filter for use in a vacuum food processor and a vacuum food processor including the filter.

In first aspect, a filter for use in a vacuum food processor is provided. The filter comprising: a first filter part adapted to direct a suction airflow generated by a vacuum module of the vacuum food processor into the filter via an inlet channel; and a second filter part adapted to coaxially fit with the first filter part and comprising a cavity, an inner surface of the cavity adapted to maintain non-gaseous substance that is moving along with the suction airflow inside the filter, wherein the first filter part and the second filter part jointly define an outlet channel at a bottom of first filter part, the outlet channel adapted to direct the suction airflow outside the filter.

It will be appreciated that according to embodiments of the present disclosure, when some food particles/bubbles enter the filter via the inlet channel, the food particles/bubbles can be effectively trapped within the inner surface of the second filter part, while allowing the suction air flow to escape from the filter via the downstream outlet channel formed at the bottom of the filter, and to subsequently be conveyed or sucked into the vacuum module through, for example, a gas channel in communication with the filter. In this way, the food particles/bubbles can be spatially separated from the suction air flow in a simple and reliable manner. In addition, such filter has simple construction, which eases the fabrication and in turn reduces the overall cost.

In some embodiments, the first filter part comprises a first rib extending in a circumferential direction and oriented in a axial direction of the filter; and the second filter part comprises a second rib extending in the circumferential direction and oriented in the axial direction, wherein the first rib and the second rib, when fitted with each other, form a first gap as a first part of the outlet channel.

In some embodiments, when the first rib and the second rib are fitted with each other, the first rib is separated from the second rib by a first offset in a radial direction, and/or by a second offset in the axial direction.

With the arrangement and fitting of the two ribs, a first barrier can be formed to prevent the food particles/bubbles from entering into the outlet channel, while the formed first air gap, as a part of the outlet channel, allows the suction air flow to pass through.

In some embodiments, the first filter part further comprises a third rib oriented in the axial direction and coaxially arranged with the first rib, the third rib being provided outside the first rib in a radial direction; and the second filter part further comprises a fourth rib oriented in the axial direction and coaxially arranged with the second rib, the fourth rib being provided outside the second rib in the radial direction, wherein when the second filter part is fit with the first filter part, the third rib and the fourth rib forms a second gap as a second part of the outlet channel.

In some embodiments, when the third rib and the fourth rib are fitted with each other, the third rib is separated from the fourth rib by a third offset in a radial direction, and/or by a fourth offset in the axial direction.

With the arrangement and fitting of the additional two ribs, a second barrier is formed to secure that the small (or very small) amount of food particles/bubbles that may cross the first barrier, will not enter into the vacuum module. In the meantime, the second air gap, as another part of the outlet channel, still allows the suction air flow to pass through.

In some embodiments, the first rib is integrally formed with the first filter part, and the second rib is integrally formed with the second filter part. In some embodiments, the third rib is integrally formed with the first filter part, and the fourth rib is integrally formed with the second filter part. In this way, less individual components are required, which eases the fabrication and assembly.

In some embodiments, when the second filter part is fit with the first filter part, the second rib is arranged downstream to the first rib along a direction of the suction airflow, the third rib is arranged downstream to the second rib along the direction of the suction airflow, and the fourth rib is arranged downstream to the third rib along the direction of the suction airflow.

With such relative arrangement and the associated meshing among the multiple ribs, a meander-shaped outlet channel that consists of multiple gaps can be formed, which enables an effective blocking effect to the food particles/bubbles.

In some embodiments, the first filter part comprises a first rib, the first rib extending in a circumferential direction and having a first end face perpendicular to the axial direction of the filter; and the second filter part comprises a second end face perpendicular to the axial direction, wherein when the first filter element is fitted with the second filter element, the first end face is in contact with the second end face in the axial direction, but with a micro gap therebetween for the suction airflow to pass through, and the micro gap forms a part of the outlet channel.

In some embodiments, the cavity comprises a first sub-cavity and a second sub-cavity surrounding the first sub-cavity in a circumferential direction, wherein the first sub-cavity defines a gripping region on an outer surface of the second filter part, and the second sub-cavity defines an inclined region on the outer surface of the second filter part.

The gripping region formed on the outer surface of the second filter part facilitates the operator's gripping from outside, which in turn eases the assembly and tuning. Moreover, the second sub-cavity expands the internal space for trapping the food particles/bubbles.

In some embodiments, the first filter part comprises a fastening hook; and the second filter part comprises a fastening hole adapted to receive the fastening hook to fit the second filter part with the first filter part. In this way, the two filter parts can be attached to each other in a simple and secured way.

In some embodiments, the first filter part comprises a connecting part adapted to detachably hinge the first filter part to a lid of the vacuum food processor in a radial direction. In this way, the filter can be rotatably attached to the lid of the vacuum food processor, and easily detached from the lid for cleanness or maintains.

In some embodiments, the first filter part comprises a pin, and the second filter part comprises a slot adapted to receive the pin to prevent a rotation of the second filter part with respect to the first filter part in a circumferential direction.

In this way, the rotation of the second filter part relative to the first filter part can be prevented, and thereby enabling a secured mounting. Moreover, the pin and slot may provide the operator an intuitive indication to accurately locate the second filter part with respect to the first filter part during the mounting.

In some embodiments, the first rib is adapted to support the second filter part, when the second filter part is fit with the first filter part, wherein the first rib comprises a contact surface facing toward the inner surface of the cavity, and the contact surface is adapted to match an inner surface of the inclined region. In this way, a more stable and secured supporting as well as a better sealing effect can be achieved.

In some embodiments, the first filter part may include a handle. The handle may allow the operator to conveniently hold and open the filter.

In second aspect, a vacuum food processor is provided. The vacuum food processor comprising the filter according to the first aspect of the present disclosure.

Through the following discussions, it would be apparent that compared to conventional vacuum food processors, the vacuum food processor including the filter according to various embodiments of present disclosure prevents the vacuum module from being contaminated by the sucked-in liquid, steam, food particles along with the suction airflow. Meanwhile, due to the less-complex design, the overall cost of the appliance is reduced and the fabrication/assembly is simplified.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

Throughout the drawings, the same or similar reference symbols are used to indicate the same or similar elements.

DETAILED DESCRIPTION OF EMBODIMENTS

Figure 1A:
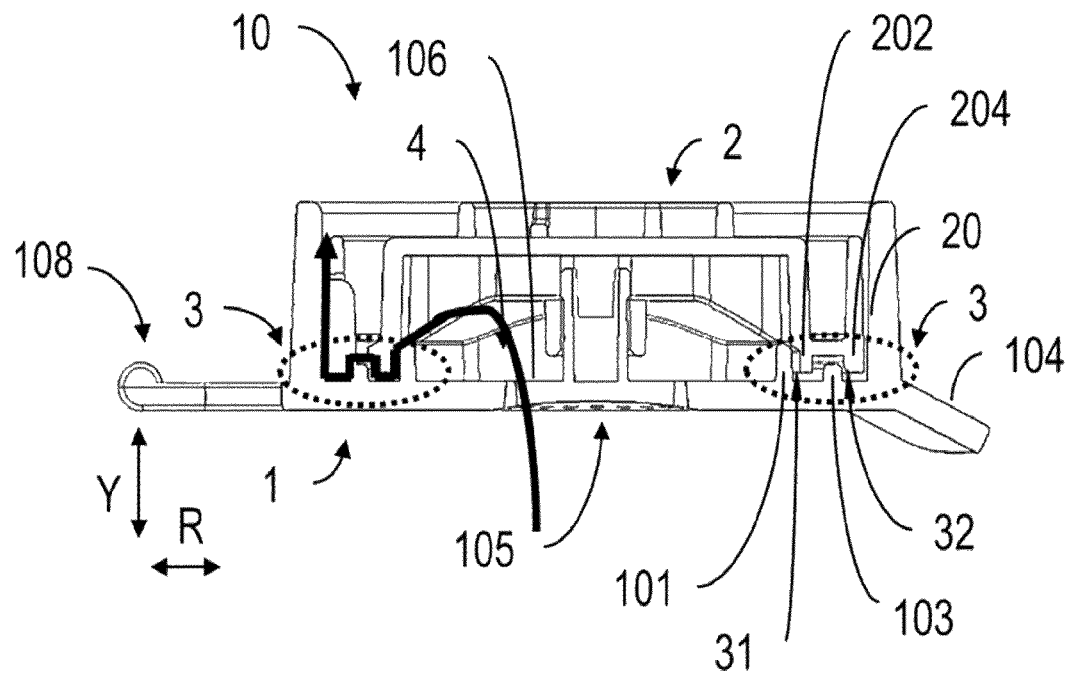
FIG. 1A illustrates a cross-sectional view of a filter, in accordance with an embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

During the vacuum process performed by the vacuum food processor, a vacuum module will suck the air from the jar assembly containing food to form suction air flow. Sometimes, there are liquids, food particles or steam moving together with the suction air flow due to high vacuum pressure in a range of −70 to −80 Kpa. To avoid these liquids or food particles not to be directly sucked into the vacuum module that consists of motor pump, tubes, control electronics, pressure sensors, etc., a filter is proposed herein to trap these liquids, food particles and steams.

Figure 1B:
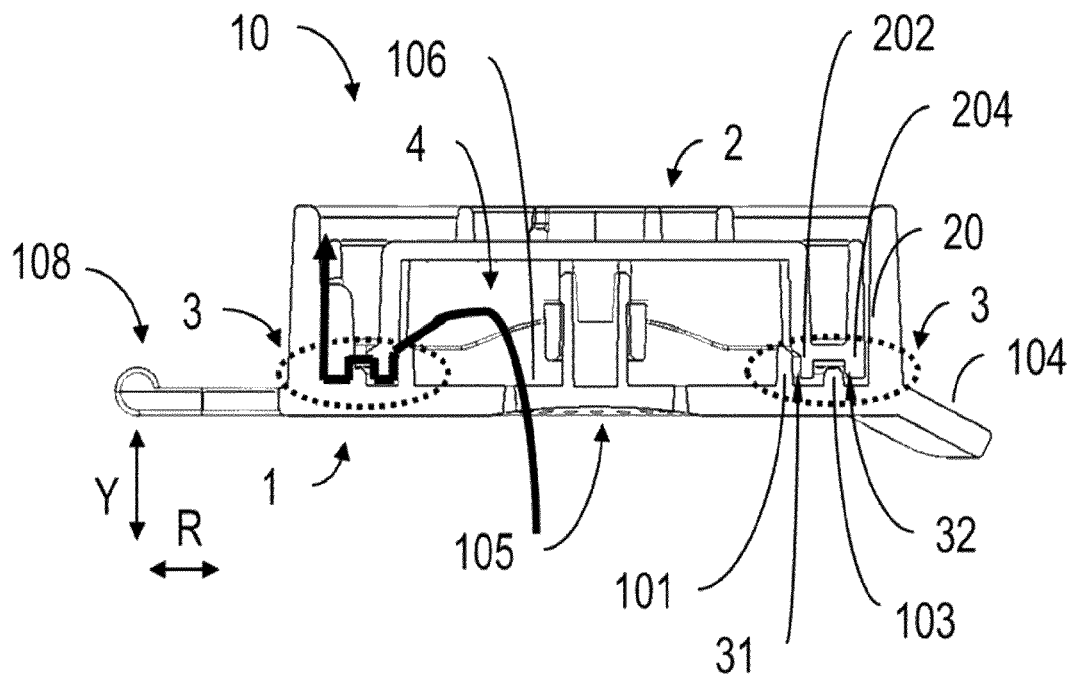
FIG. 1B illustrates a simplified cross-sectional view of the filter of FIG. 1A.
Figure 1C:
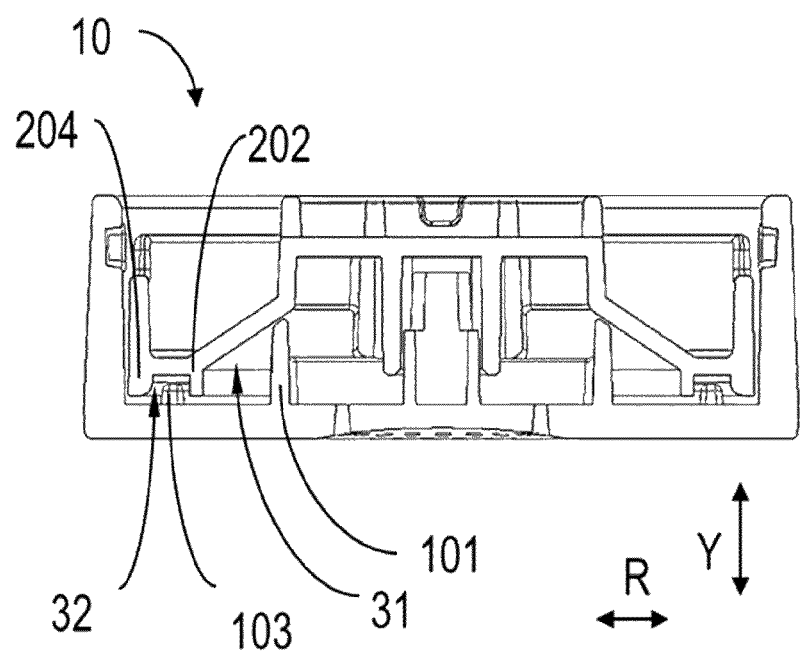
FIG. 1C illustrates another cross-sectional view of the filter of FIG. 1A.

FIG. 1A illustrates a cross-sectional view of a filter for use in a vacuum food processor, in accordance with an embodiment of the present disclosure. FIG. 1B illustrates a simplified cross-sectional view of the filter of FIG. 1A. In FIG. 1B, for the purpose of clarity, some profile lines from different surface/planes are intentionally removed to avoid unnecessary confusion and to simultaneously highlight the cavity. FIG. 1C illustrates another cross-sectional view of the filter that is perpendicular to the cross-sectional view as illustrated in FIG. 1A.

As shown, the filter 10 includes a first filter part 1 and a second filter part 2. The first filter part 1 is adapted to direct a suction airflow 20 that generated by a vacuum module of the vacuum food processor into the filter 10 via an inlet channel 105. In some embodiments, as shown in FIG. 1A, the inlet channel 105 can be in the form of a plurality holes.

Further, the second filter part 2 is adapted to coaxially fit with the first filter part 1 and including a cavity 4. The inner surface of the cavity 4 is adapted to maintain non-gaseous substance (such as liquid, steam, or food particles) that is moving along with the suction airflow 20 inside the filter 10. Furthermore, as shown in FIG. 1A, the first filter part 1 and the second filter part 2 jointly define an outlet channel 3 at a bottom 106 of first filter part 1. The outlet channel 3 is adapted to direct the suction airflow 20 outside the filter 10.

With the construction of the filter 10, when some food particles/bubbles enters the filter via the inlet channel 105, the food particles/bubbles can be effectively trapped within the inner surface of the second filter part 2, while the suction air flow 20 is still allowed to escape out of the filter 10 via the downstream outlet channel 3 formed at the bottom 106 of the filter 10, and is subsequently conveyed or sucked into the vacuum module through, for example, a gas channel in communication with the filter 10.

In this way, the food particles/bubbles can be spatially separated from the suction air flow in a simple manner. In addition, compared to some conventional designs, the filter 10 according to various embodiment of the disclosure requires less individual components and does not require complex design, which eases the fabrication and in turn reduces the overall cost for fabrication and maintenance.

In some embodiments, as shown in FIG. 1A, the first filter part 1 may include a first rib 101, the first rib 101 extends in a circumferential direction C, and extends in a axial direction Y of the filter 10 by a certain height, to protrude from the bottom of the first filter part 1. Further, the second filter part 2 may include a second rib 202 extending in the circumferential direction C in a similar manner as the first rib 101, and extending in the axial direction Y by a certain height, to protrude from the second filter part 2. As further illustrated in FIG. 1A, the first rib 101 and the second rib 202, when fitted with each other, can form a first gap 31 as a first part of the outlet channel 3.

In some embodiments, when the first rib 101 and the second rib 202 are fitted with each other, the first rib 101 is separated from the second rib 202 by a first offset in a radial direction R, and by a second offset in the axial direction Y. In this way, a bent first air gap 31 can be formed. The offset in the radial direction means that the projections of the two ribs in the radial direction do not coincide with each other. Due to the thickness of the ribs, their projections in the radial direction being not coincided with each other includes a complete non-coincidence or a partial non-coincidence. The offset in the axial direction refers to that the distal ends in which two ribs extend axially (that is, the projections of the tips of the first rib and the second rib) are not overlapped with each other in the axial direction. In the assembly state, the tip of the first rib is the highest end of the first rib, and the tip of the second rib is the lowest end of the second rib. The first gap 31 is formed when the highest end of the first rib is lower than the lowermost end of the second rib. Making the gap 31 to be small enough can block non-gaseous foam or impurities from passing through the gap 31. When the first rib and the second rib have an offset in the radial direction, the highest end of the first rib can be higher than the lowest end of the second rib, and then a meandered airflow channel can be formed. This is very beneficial for blocking non-gaseous foams or impurities.

With such arrangement and fitting of the two ribs, a first barrier can be formed to prevent the food particles/bubbles from entering into the outlet channel 3, while the formed first air gap 31, as a part of the outlet channel 3, allows the suction air flow 20 to pass through.

In some embodiments, the first rib 101 and the second rib 202 can be integrally formed with the first filter part 1 and the second filter part 2, respectively, by means of, for example, extrusion and injection moulding. In this way, less individual components are required, which reduces the difficulties in the fabrication and assembly.

In some embodiments, as shown in FIG. 1A, the first filter part 1 may further include a third rib 103 protruding in the axial direction Y and coaxially arranged with the first rib 101, and the second filter part 2 may further include a fourth rib 204 protruding in the axial direction Y and coaxially arranged with the second rib 202. Further, the third rib 3 may be provided outside the first rib 101 in a radial direction R, and the fourth rib 204 may be provided outside the second rib 202 in the radial direction R. Furthermore, as shown in FIG. 1A, when the second filter part 2 is fit with the first filter part 1, the third rib 103 and the fourth rib 204 forms a second gap 32 as a second part of the outlet channel 3.

In some embodiments, when the third rib 103 and the fourth rib 204 are fitted with each other, the third rib 103 is separated from the fourth rib 204 by a third offset in a radial direction R, and by a fourth offset in the axial direction Y. In this way, a bent second air gap 32 likewise can be formed.

With such arrangement and fitting of the additional two ribs, a second barrier is formed to secure that the small (or very small) amount of food particles/bubbles that may cross the first barrier, will not enter into the vacuum module. In the meantime, the second air gap 32, as another part of the outlet channel 3, still allows the suction air flow 20 to pass through and escape from the cavity 4, and to be subsequently conveyed or sucked into the vacuum module through, for example, a gas channel in communication with the filter 10.

Likewise, in some embodiments, the third rib 103 and the fourth rib 204 can be integrally formed with the first filter part 1 and the second filter part 2, respectively, by means of, for example, extrusion and injection moulding to ease the fabrication and assembly.

In the example as illustrated in FIG. 1A, with respect to a direction of the suction airflow 20, the second rib 202 is arranged downstream to the first rib 101, the third rib 103 is arranged downstream to the second rib 202, and the fourth rib 204 is arranged downstream to the third rib 103.

With such relative arrangement and the associated meshing among the multiple ribs from the first and second filter parts, a meander-shaped outlet channel 3 that consists of multiple gaps is formed, which enables a more effective blocking to the food particles/bubbles. In other words, the difficulty for food particles/bubbles to reach the vacuum module is increased.

In addition, it is to be noted that in some embodiments, the radially meander-shaped outlet channel 3 also forms a ring shape in the circumferential direction C, which significantly expands the range where the suction airflow 20 can be discharged from the cavity 4. That is, a three-dimensional outlet channel 3 is formed. In this way, even when the outlet channel 3 is clogged with some food particles/bubbles at a certain position in the circumferential direction C, the air flow 20 can still be discharged from other positions with no hindrance. This increases the safety and stability of the filter 10.

In some alternative embodiments, the first filter part 1 may include a first rib 101 as shown in FIG. 1A, the first rib 101 has a first end face perpendicular to the axial direction Y of the filter 10. However, the second filter 2 may not have a second lib, rather, the second filter part 2 only has a second end face perpendicular to the axial direction Y. In this case, when the first filter element 1 is fitted with the second filter element 2 along the axial direction Y, the first end face of the first rib 101 is in contact with the second end face of the second filter part 2 in the axial direction Y. In other words, the second filter part 2 is supported by the first filter part in the axial direction Y via the contact between the first end surface and the second end surface.

In this way, a micro gap between the first and second end surfaces still can be defined for the suction airflow 20 to pass through. The micro gap forms a part of the outlet channel 3 to only allow the airflow to pass through and meanwhile effectively blocking the foams or impurities.

Still referring to FIG. 1A, in some embodiments, the first filter part 1 may include a connecting part 108 adapted to detachably hinge the first filter part 1 to a lid of the vacuum food processor in a radial direction R. In this way, the filter can be rotatably attached to the lid of the vacuum food processor and easily detached from the lid for cleanness or maintains. In some embodiments, the first filter part 1 may include a handle 104 to allow the operator to conveniently hold and open the filter 10.

Figure 2A:
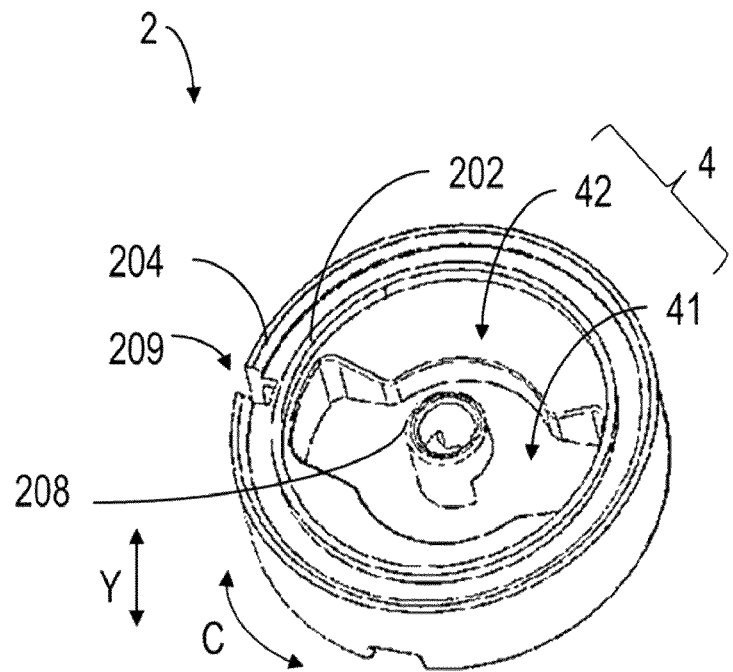
FIG. 2A illustrates an internal view of a second filter part of the filter in accordance with embodiments of the present disclosure.
Figure 2B:
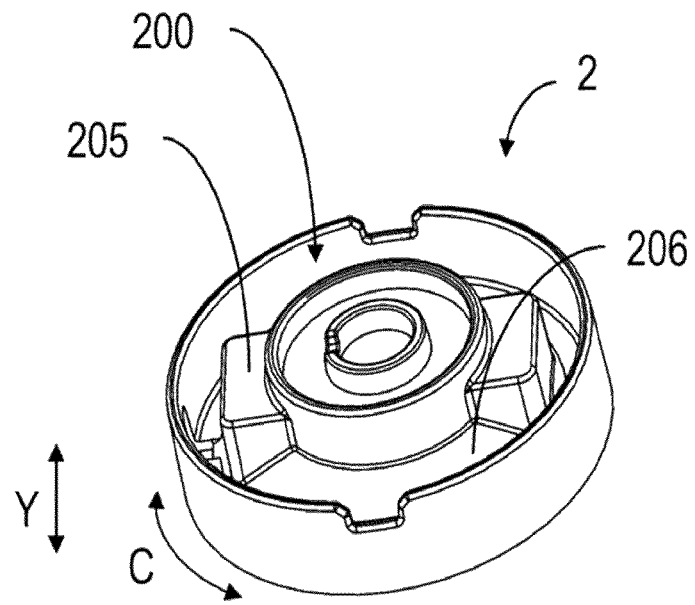
FIG. 2B illustrates an external view of the second filter part of the filter of FIG. 2A.

FIG. 2A and FIG. 2B illustrate a bottom view and a top view of a second filter part of the filter, respectively, in accordance with an embodiment of the present disclosure. As shown in FIG. 2A, the cavity 4 may include a first sub-cavity 41 and a second sub-cavity 42 surrounding the first sub-cavity 41 in a circumferential direction C. Further, as shown FIG. 2B, the first sub-cavity 41 defines a gripping region 205 on an outer surface 200 of the second filter part 2, and the second sub-cavity 42 defines an inclined region 206 on the outer surface 200 of the second filter part 2.

The gripping region 205 formed on the outer surface 200 of the second filter part 2 facilitates the operator's gripping from outside, which in turn eases the assembly and tuning. Moreover, the second sub-cavity 42 expands the internal space for trapping the food particles/bubbles. This is especially beneficial when there is a great amount of generated food particles/bubbles.

In some embodiments, the first sub-cavity 41 and a second sub-cavity 42 (as well as gripping region 205 and the inclined region 206) can be formed by means of, for example, extrusion and injection moulding to ease the fabrication and enhance the overall stiffness of the filter part.

Figure 3:
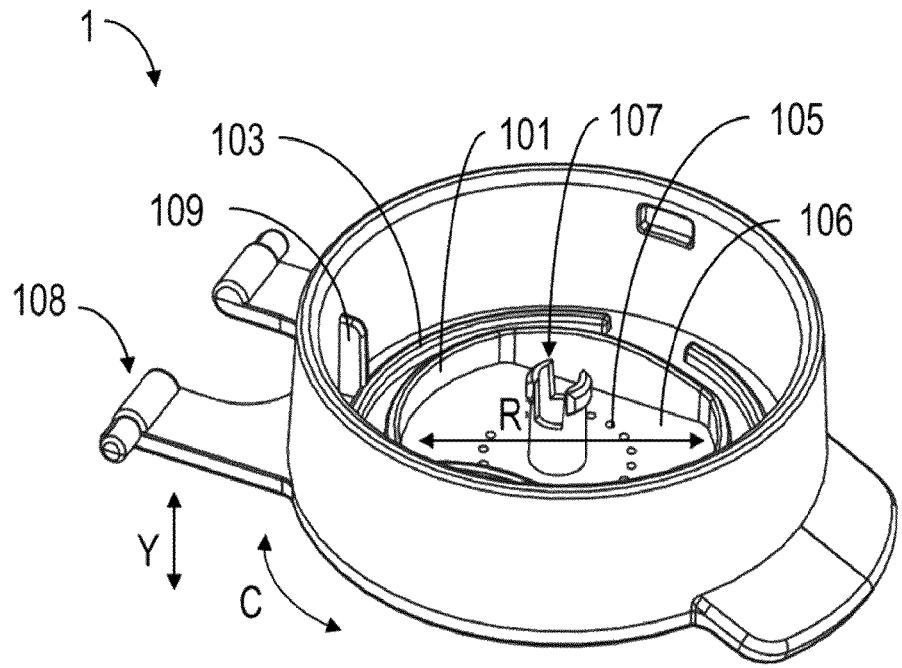
FIG. 3 illustrates a perspective view of a first filter part of the filter, in accordance with an embodiment of the present disclosure.

FIG. 3 illustrates a perspective view of a first filter part of the filter, in accordance with an embodiment of the present disclosure. As illustrated in FIG. 3, in some embodiments, the first filter part 1 may include a fastening hook 107. As illustrated in FIG. 2A, the second filter part 2 may include a corresponding fastening hole 208 adapted to receive the fastening hook 107 to fit the second filter part 2 with the first filter part 1. In this way, the two filter parts can be attached to each other in a simple and secured way.

Still referring to FIG. 2A and FIG. 3, in some embodiments, the first filter part 1 may include a pin 109, and the second filter part 2 may include a slot 209 adapted to receive the pin 109 to prevent a rotation of the second filter part 2 with respect to the first filter part 1 in a circumferential direction C.

In this way, the rotation of the second filter part 2 relative to the first filter part 1 can be prevented, and thereby enabling a secured mounting. Moreover, the pin 109 and slot 209 may provide the operator with an intuitive indication to accurately locate the second filter part 2 with respect to the first filter part 1.

In some embodiments, the first rib 101 is adapted to support the second filter part 2 when the second filter part 2 is fit with the first filter part 1, as shown in FIG. 1. Further, the first rib 101 may include a contact surface facing toward the inner surface of the cavity 4, and the contact surface is adapted to match an inner surface of the inclined region 206. Due to the fact that the profile of the first rib 101 follows the profile of the inner surface of the second filter part 2, a more stable and secured supporting can be achieved. In some embodiments, the second filter part 2 may be designed to be slightly liftable in the axial direction Y with respect to the first filter part 1 under the push of the vacuum air flow, so as to open the outlet channel 3.

Figure 4:
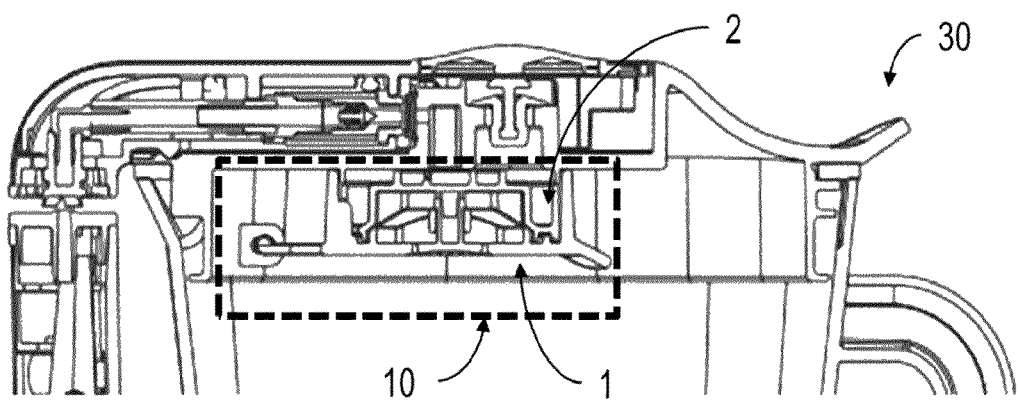
FIG. 4 illustrates a filter hinged to a lid of the vacuum food processor, in accordance with an embodiment of the present disclosure.

FIG. 4 illustrates the filter 10 hinged to a lid 30 of the vacuum food processor, in accordance with an embodiment of the present disclosure. As discussed above, the filter 10 may be rotatably attached to the lid 30 of the vacuum food processor via the connecting part 108 and easily detached from the lid 30 for cleanness or maintains.

It is to be understood that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

The invention claimed is:

1. A filter for use in a vacuum food processor, the filter comprising:
   a first filter part adapted to direct a suction airflow generated by a vacuum module of the vacuum food processor into the filter via an inlet channel; and
   a second filter part adapted to coaxially fit with the first filter part and comprising a cavity, an inner surface of the cavity adapted to maintain non-gaseous substance that is moving along with the suction airflow inside the filter, wherein the first filter part and the second filter part jointly define an outlet channel at a bottom of the first filter part based on at least an associated meshing among a plurality of ribs from the first filter part and the second filter part, the outlet channel adapted to direct the suction airflow outside the filter.

2. The filter of claim 1,
   wherein the first filter part comprises a first rib of the plurality of ribs extending in a circumferential direction (C) and oriented in an axial direction (Y) of the filter, and
   wherein the second filter part comprises a second rib of the plurality of ribs extending in the circumferential direction (C) and oriented in the axial direction (Y), wherein the first rib and the second rib, when fitted in each other, form a first gap as a first part of the outlet channel.

3. The filter of claim 2, wherein, when the first rib and the second rib are fitted with each other, the first rib is separated from the second rib by a first offset in a radial direction (R), and/or by a second offset in the axial direction (Y).

4. The filter of claim 2,
   wherein the first filter part further comprises a third rib oriented in the axial direction (Y) and coaxially arranged with the first rib, the third rib being provided outside the first rib in a radial direction (R),
   wherein the second filter part further comprises a fourth rib oriented in the axial direction (Y) and coaxially arranged with the second ribs, the fourth rib being provided outside the second rib in the radial direction, and
   wherein when the second filter part is fit with the first filter part, the third rib and the fourth rib forms a second gap as a second part of the outlet channel.

5. The filter of claim 4, wherein, when the third rib and the fourth rib are fitted with each other, the third rib is separated from the fourth rib by a third offset in a radial direction (R), and/or by a fourth offset in the axial direction (Y).

6. The filter of claim 4, wherein,
when the second filter part is fit with the first filter part,
the second rib is arranged downstream to the first rib along a direction of the suction airflow,
the third rib is arranged downstream to the second rib along the direction of the suction airflow, and
the fourth rib is arranged downstream to the third rib along the direction of the suction airflow.

7. The filter of claim 4,
wherein the first rib is integrally formed with the first filter part, and
wherein the second rib is integrally formed with the second filter part; and/or
wherein the third rib is integrally formed with the first filter part, and
wherein the fourth rib is integrally formed with the second filter part.

8. The filter of claim 2,
wherein the first rib is adapted to support the second filter part when the second filter part is fit with the first filter part, and
wherein the first rib comprises a contact surface facing toward the inner surface of the cavity, the contact surface is adapted to match an inner surface of the inclined region.

9. The filter according to claim 1,
wherein the first filter part comprises a first rib of the plurality of ribs, the first rib extending in a circumferential direction (C) and having a first end face perpendicular to the axial direction (Y) of the filter,
wherein the second filter part comprises a second end face perpendicular to the axial direction (Y), and
wherein when the first filter element is fitted with the second filter element, the first end face is in contact with the second end face in the axial direction (Y), but with a micro gap therebetween for the suction airflow to pass through, and the micro gap forms a part of the outlet channel.

10. The filter of claim 1,
wherein the cavity comprises a first sub-cavity and a second sub-cavity surrounding the first sub-cavity in a circumferential direction (C), and
wherein the first sub-cavity defines a gripping region on an outer surface of the second filter part, and the second sub-cavity defines an inclined region on the outer surface of the second filter part.

11. The filter of claim 1,
wherein the first filter part comprises a handle.

12. A filter for use in a vacuum food processor, the filter comprising:
a first filter part adapted to direct a suction airflow generated by a vacuum module of the vacuum food processor into the filter via an inlet channel; and
a second filter part adapted to coaxially fit with the first filter part and comprising a cavity, an inner surface of the cavity adapted to maintain non-gaseous substance that is moving along with the suction airflow inside the filter, wherein the first filter part and the second filter part jointly define an outlet channel at a bottom of the first filter part the outlet channel adapted to direct the suction airflow outside the filter
wherein the first filter part comprises a fastening hook,
wherein the second filter part comprises a fastening hole adapted to receive the fastening hook to fit the second filter part with the first filter part.

13. A filter for use in a vacuum food processor, the filter comprising:
a first filter part adapted to direct a suction airflow generated by a vacuum module of the vacuum food processor into the filter via an inlet channel; and
a second filter part adapted to coaxially fit with the first filter part and comprising a cavity, an inner surface of the cavity adapted to maintain non-gaseous substance that is moving along with the suction airflow inside the filter, wherein the first filter part and the second filter part jointly define an outlet channel at a bottom of the first filter part the outlet channel adapted to direct the suction airflow outside the filter,
wherein the first filter part comprises a connecting part adapted to detachably hinge the first filter part to a lid of the vacuum food processor in a radial direction (R).

14. A filter for use in a vacuum food processor, the filter comprising:
a first filter part adapted to direct a suction airflow generated by a vacuum module of the vacuum food processor into the filter via an inlet channel; and
a second filter part adapted to coaxially fit with the first filter part and comprising a cavity, an inner surface of the cavity adapted to maintain non-gaseous substance that is moving along with the suction airflow inside the filter, wherein the first filter part and the second filter part jointly define an outlet channel at a bottom of the first filter part the outlet channel adapted to direct the suction airflow outside the filter,
wherein the first filter part comprises a pin, and
wherein the second filter part comprises a slot adapted to receive a pin to prevent a rotation of the second filter part with respect to the first filter part in a circumferential direction (C).

15. A vacuum food processor comprising a filter, wherein the filter further comprises:
a first filter part adapted to direct a suction airflow generated by a vacuum module of the vacuum food processor into the filter via an inlet channel; and
a second filter part adapted to coaxially fit with the first filter part and comprising a cavity, an inner surface of the cavity adapted to maintain non-gaseous substance that is moving along with the suction airflow inside the filter, wherein the first filter part and the second filter part jointly define an outlet channel at a bottom of the first filter part based on at least an associated meshing among a plurality of ribs from the first filter part and the second filter part, the outlet channel adapted to direct the suction airflow outside the filter.

* * * * *